E. H. JOHNSON.
IMPLEMENT FOR BOILING EGGS.
APPLICATION FILED SEPT. 25, 1915.

1,250,888.

Patented Dec. 18, 1917.

Inventor
E. H. Johnson,

Witnesses

By

Attorney

UNITED STATES PATENT OFFICE.

EDWARD H. JOHNSON, OF BINGHAMTON, NEW YORK.

IMPLEMENT FOR BOILING EGGS.

1,250,888.  Specification of Letters Patent.  Patented Dec. 18, 1917.

Application filed September 25, 1915. Serial No. 52,548.

*To all whom it may concern:*

Be it known that I, EDWARD H. JOHNSON, a citizen of the United States, residing at Binghamton, in the county of Broome and State of New York, have invented a new and useful Implement for Boiling Eggs, of which the following is a specification.

This invention relates generally to improvements in culinary implements, and particularly to an implement for boiling eggs, and the object is to provide a simple and convenient implement by means of which eggs may be readily boiled and served without breakage.

With the above object in view, the invention consists in the novel features of construction hereinafter fully described, particularly pointed out in the claims, and clearly illustrated by the accompanying drawing, in which—

Figure 1:
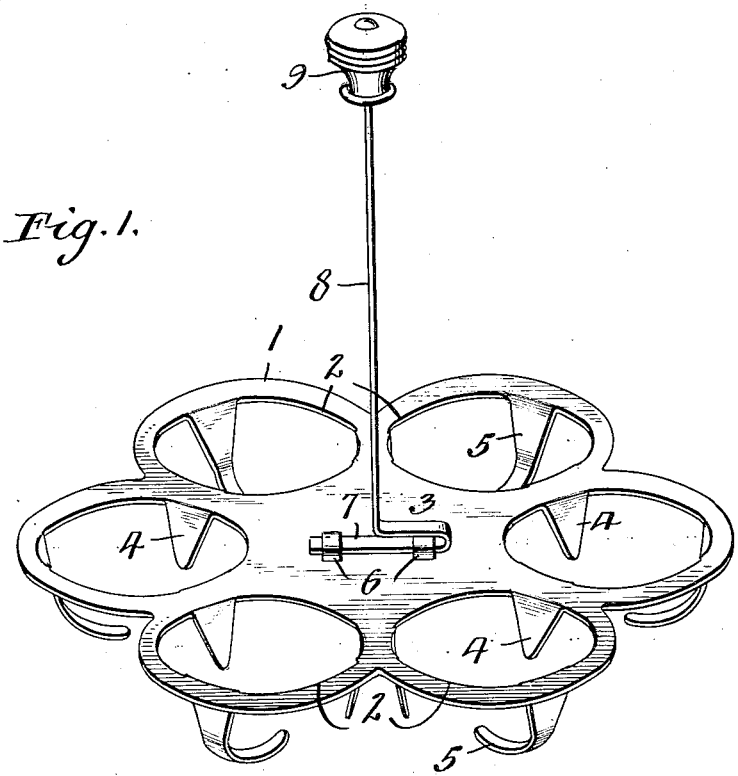
Figure 2:
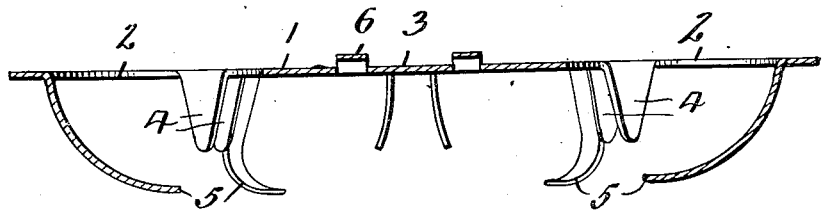

Figure 1 is a perspective view of an implement embodying the invention;

Fig. 2, a vertical sectional view of the same, and

Figure 3:
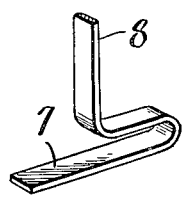

Fig. 3, a view of the hooked end of the stem.

Referring now more particularly to the accompanying drawing, the numeral 1, designates the body of the implement which is constructed of a single sheet of metal having formed therein, a number of circular egg-receiving openings 2, which are arranged in a circle about the central solid portion 3. Formed from the same sheet of metal and depending from the edges of the egg-receiving openings and extending below the body-portion, are the projections 4. Each opening is represented as having two of the projections 4 and one of the projections 5, said projections being spaced substantially equidistant around the edges of said openings. Said projections 5 are of greater length than the projections 4, and constitute feet for the boiler, in addition to forming with the projections 4, a support or cradle for the eggs.

The outline of the body 1 consists of a series of semi-circles each substantially concentric with one of the openings 2, respectively, for the purpose of insuring ample space between the walls of any vessel in which eggs are boiled and the edge of the body of this implement, so as to permit suitable circulation of the liquid.

Formed in the solid portion 3 of the body, are the two spaced loops 6 to receive the lower hook-end 7 of a stem 8 which carries a knob 9 at its opposite end, said knob being of material which is a poor conductor of heat and said stem being of such length as to elevate said knob a suitable distance above said body, to the end that said knob may be grasped without inconvenience when said body is immersed in boiling water, and thus constituting a convenient handle for said body. The tops of the loops 6 are flattened and the hooked-end 7 is of rectangular cross-section snugly fitting therein and so formed that said stem 8 may be securely attached to said body in co-axial relation therewith. The loops 6 are so positioned with relation to certain of the egg openings 2 that, when eggs are placed in said openings, the accidental disengagement of said hooked-end 7 from said loops is effectively blocked.

As shown, the two projections 4 and the single projection 5 for each egg-receiving opening or receptacle, are all inclined toward the center of the opening to follow the contour of the end of an egg, thus forming a secure holder for such egg while it is being lifted into and out of the vessel in which it is being boiled, and also during the boiling operation, and while on the table.

By so forming the projections 4 and 5 of each of the openings 2 as to follow the contour of an egg, the pressure upon the shells of eggs placed therein is so distributed as to minimize likelihood of the breakage thereof during the process of boiling.

In use, as many eggs as it is desired to boil, within the capacity of the implement, the drawing showing an implement having receptacles for six eggs, are placed, each in the egg-receiving opening provided, and the implement placed in the vessel by means of the handle. When the boiling is completed, the implement is lifted, with the eggs, from the vessel and carried to the table, by the handle. The implement may be used upon the table, being neat in appearance, the eggs being served therefrom.

For packing, or when not in use, the handle may be detached, so that the implement will occupy but little space.

From the above description and by reference to the drawing, it will be seen that a very simple and inexpensive implement is provided by means of which a number of eggs may be boiled, the eggs being lifted in their entirety into and out of the vessel and served on the table, the implement being attractive in appearance and convenient in use.

Having thus fully described the invention, what I claim as new and desire to secure by Letters Patent of the United States, is:

1. In an article of the character described, a sheet-metal body having a plurality of egg receiving openings formed therein, the outline of said body comprising a series of semicircles substantially concentric with said openings, respectively, projections formed integral with said body and depending from the edges of said openings, said projections being shaped and arranged to conform to the contour of the end of an egg and certain of said projections being longer than the others and forming feet for said body, and a suitable handle for said body.

2. In an article of the character described, a sheet-metal body having a plurality of egg receiving openings formed therein, the outline of said body comprising a series of semicircles substantially concentric with said openings, respectively, projections formed integral with said body and depending from the edges of said openings, said projections being shaped and arranged to conform to the contour of the end of an egg, three of said projections being provided for each of said openings and spaced substantially equidistant around the edges thereof, one of said projections for each of a plurality of said openings being longer than the others and forming feet for said body, and a suitable handle for said body.

3. In an article of the character described, a sheet-metal body having a plurality of egg receiving openings formed therein, the outline of said body comprising a series of semicircles substantially concentric with said openings, respectively, projections formed integral with said body and depending from the edges of said openings, said projections being shaped and arranged to conform to the contour of the end of an egg, three of said projections being provided for each of said openings and spaced substantially equidistant around the edges thereof, one of said projections for each of a plurality of said openings being longer than the others and forming feet for said body, a pair of raised loops formed in the upper face of said body near the center portion thereof, and a suitable handle having an end thereof so fitted to said loops as to be adapted to insertion in or removal from said loops.

4. In an article of the character described, a sheet-metal body having a plurality of egg receiving openings formed therein, the outline of said body comprising a series of semicircles substantially concentric with said openings, respectively, projections formed integral with said body and depending from the edges of said openings, said projections being shaped and arranged to conform to the contour of the end of an egg, three of said projections being provided for each of said openings and spaced substantially equidistant around the edge thereof, one of said projections for each of a plurality of said openings being longer than the others and forming feet for said body, raised flat-topped loops formed in the upper face of said body near the center portion thereof, and a detachable handle having an end of rectangular cross-section adapted to so engage said loops as to maintain said handle substantially co-axial with said body.

5. In an article of the character described, a sheet-metal body having a plurality of egg receiving openings formed therein, the outline of said body comprising a series of semicircles substantially concentric with said openings, respectively, projections formed integral with said body and depending from the edges of said openings, said projections being shaped and arranged to conform to the contour of the end of an egg, three of said projections being provided for each of said openings and spaced substantially equidistant around the edge thereof, one of said projections for each of a plurality of said openings being longer than the others and forming feet for said body, raised flat-topped loops formed in the upper face of said body near the center portion thereof, and a detachable handle comprising a knob and a stem to one end of which said knob is secured, said stem being of such length as to be adapted to support said knob a suitable distance above said body and the opposite end of said stem being of rectangular cross-section, bent at right angles to the major portion of said stem, and adapted to so fit in said loops as to maintain said stem substantially co-axial with said body.

6. In an article of the character described, a sheet-metal body having a plurality of egg receiving openings formed therein, projections formed integral with said body and depending from the edges of said openings, said projections being shaped and arranged to conform to the contour of the end of an egg and certain of said projections being longer than the others, a pair of raised loops formed in the upper face of said body near the center portion thereof and disposed along a line passing through the center of two of said egg receiving openings, a detachable handle comprising a stem having an end bent at right angles to the major portion thereof and adapted to suitably fit into said loops, said bent end being of a length greater than the distance from said loops to the adjoining edges of said two openings, respectively.

In testimony whereof, I have signed my name to this specification, in the presence of two subscribing witnesses.

EDW. H. JOHNSON.

Witnesses:
ED SHILLING,
L. A. SHOVE.